US009774663B2

(12) United States Patent
Garofalo et al.

(10) Patent No.: US 9,774,663 B2
(45) Date of Patent: Sep. 26, 2017

(54) DIGITAL MAGAZINE DISTRIBUTION USING FEEDS

(71) Applicant: Google Inc., Mountain View, CA (US)

(72) Inventors: Charles Edward Garofalo, Framingham, MA (US); Maurice Bennett Shore, Carlisle, MA (US); Sami Mohammed Shalabi, Lexington, MA (US)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 14/597,098

(22) Filed: Jan. 14, 2015

(65) Prior Publication Data

US 2016/0205173 A1   Jul. 14, 2016

(51) Int. Cl.
G06F 15/16 (2006.01)
H04L 29/08 (2006.01)

(52) U.S. Cl.
CPC .............. *H04L 67/10* (2013.01); *H04L 67/02* (2013.01)

(58) Field of Classification Search
CPC ...................................................... H04L 67/10
USPC ......................................................... 709/217
See application file for complete search history.

(56) References Cited

U.S. PATENT DOCUMENTS

| 6,868,525 | B1* | 3/2005 | Szabo | G06F 17/30067 |
| | | | | 705/14.53 |
| 8,065,383 | B2* | 11/2011 | Carlson | G06Q 30/06 |
| | | | | 709/217 |
| 2004/0199867 | A1 | 10/2004 | Brandenborg | |
| 2013/0145257 | A1 | 6/2013 | Shalabi et al. | |
| 2013/0185366 | A1* | 7/2013 | Joy | G06F 17/211 |
| | | | | 709/206 |
| 2014/0075296 | A1* | 3/2014 | Schaad | G06F 17/2229 |
| | | | | 715/243 |
| 2014/0351268 | A1* | 11/2014 | Weskamp | G06F 17/217 |
| | | | | 707/748 |

(Continued)

FOREIGN PATENT DOCUMENTS

KR   10-2002-0067102 A   8/2002

OTHER PUBLICATIONS

EPUB, International Digital Publishing Forum, 1999, 1 Page, [online] [Retrieved on May 11, 2015] Retrieved from the internet <URL:http://idpf.org/epub>.

(Continued)

*Primary Examiner* — S M Rahman
(74) *Attorney, Agent, or Firm* — Shumaker & Sieffert, P.A.

(57) ABSTRACT

A magazine distribution system retrieves digital content associated with a digital magazine published by a publisher by using a plurality of feeds. The magazine distribution system retrieves an issue feed from a publisher of a digital magazine. The issue feed includes information about an issue of the digital magazine. The magazine distribution system analyzes the issue feed to retrieve an identifier identifying a section feed published by the publisher. The magazine distribution system retrieves the section feed from the publisher using the identifier identifying the section feed and analyzes the retrieved section feed to identify information about the section of the digital magazine and a digital content item to be included in the section of the issue of the digital magazine. The magazine distribution system formats the issue of the digital magazine and presents the formatted issue of the digital magazine to a user.

14 Claims, 8 Drawing Sheets

(56) References Cited

U.S. PATENT DOCUMENTS

2016/0124918 A1* 5/2016 Ying .................... G06F 17/248
715/234

OTHER PUBLICATIONS feedcombine.com, "Combine multiple RSS feeds into a unique one!," Webpage for www.feedcombine.com, 2 Pages, [online] [Retrieved on May 11, 2015] Retrieved from the internet <URL:http://www.feedcombine.com/>.

Nottingham, M., et al., "The Atom Syndication Format," Network Working Group, Dec. 2005, 43 Pages.

Ocampo, M., "18 Tools to Combine RSS Feeds into a Single Feed," blueblots.com, 2011, 12 Pages, [online] [Retrieved on May 11, 2015] Retrieved from the internet <URL:http://blueblots.com/tools/rssfeeds/>.

RSS Advisory Board "RSS Best Practices Profile," World Readable, Oct. 15, 2007, 18 Pages, [online] [Retrieved on May 11, 2015] Retrieved from the internet <URL:http://www.rssboard.org/rssprofile>.

RSS Advisory Board "Media RSS Specification, Version 1.5.1," World Readable, Dec. 11, 2009, 14 Pages, [online] [Retrieved on May 11, 2015] Retrieved from the internet <URL:http://www.rssboard.org/media-rss>.

Ruby, S., et al., "About the Feed Validator," FEED Validator, 2002, 2 Pages, [online] [Retrieved on May 11, 2015] Retrieved from the internet <URL:http://feedvalidator.org/about.htm>.

PCT International Search Report and Written Opinion for PCT/US2016/013110, May 17, 2016, 10 Pages.

\* cited by examiner

```
<feed xmlns="http://www.w3.org/2005/Atom" />
    <id>urn:uuid:10a76c80d39911d9b93C00003939e0af5</id>
    <title>Acme Magazine</title>
    <updated>2014618T12:00:00Z</updated>
    <entry>
        <id>urn:uuid:10a76c80d39911d9b93C00003939e0af1</id>
        <title>Acme Monthly, July 2014</title>
        <updated>20140618T12:00:00Z</updated>
        <published>20140701T05:07:00Z</published>
        <link rel="self" type="application/atom+xml" href="./201407/acme201407.xml"/>
    </entry>
</feed>
```

FIG. 5A

```
<feed xmlns="http://www.w3.org/2005/Atom">
  <id>urn:uuid:10a76c80d39911d9b93C0003939e0af1</id>
  <title>Acme Monthly, July 2014</title>
  <updated>2014618T12:00:00Z</updated>
  <logo>http://acmemagazine.com/feed/201407/cover.jpg</logo>
  <entry>
    <id>urn:uuid:15a76480d39311d9b93C0003939e0af1</id>
    <title>Caribou Climate</title>
    <updated>20140618T12:00:00Z</updated>
    <link rel="self" type="application/atom+xml" href="./section1.xml"/>
  </entry>
  <entry>
    <id>urn:uuid:11b76480d39311d9b93C0003939e0af1</id>
    <title>Hunting Season</title>
    <updated>20140619T12:00:00Z</updated>
    <link rel="alternate" type="application/atom+xml" href="./section2.xml"/>
  </entry>
</feed>
```

FIG. 5B

```
<feed xmlns="http://www.w3.org/2005/Atom" xmlns:xhtml="http://www.w3.org/1999/xhtml" >
    <id>urn:uuid:15a76480d39311d9b93C0003939e0af1</id>
    <title>November 2014</title>
    <updated>20140717T05:45:00Z</updated>
    <published>20140801T00:45:00Z</updated>
    <entry>
        <id>urn:uuid:fd856a11eaa74e3aa1585e9c6e66978d</id>
        <updated>20140717T05:12:00Z</updated>
        <author><name>James Donner</name></author>
        <title>Warm Weather Brings Healthy Eating</title>
        <content type="xhtml">
            <div xmlns="http://www.w3.org/1999/xhtml">
                <img src="http://acmemagazine.com/img/12354.jpg" />
                <p>Here is the text that describes the image.</p>
            </div>
        </content>
    </entry>
</feed>
```

542 — `<id>urn:uuid:15a76480d39311d9b93C0003939e0af1</id>`
540 — `<title>November 2014</title>`
544 — `<updated>20140717T05:45:00Z</updated>`
546 — `<id>urn:uuid:fd856a11eaa74e3aa1585e9c6e66978d</id>`
550 — `<updated>20140717T05:12:00Z</updated>`
552 — `<author><name>James Donner</name></author>`
548 — `<title>Warm Weather Brings Healthy Eating</title>`
556 — `<content type="xhtml">`
562 — `<img src="http://acmemagazine.com/img/12354.jpg" />`
560 — `<p>Here is the text that describes the image.</p>`

DIGITAL MAGAZINE DISTRIBUTION USING FEEDS

TECHNICAL FIELD

This disclosure relates generally to the field of digital content delivery, and specifically to distributing digital magazines.

BACKGROUND

Many people consume magazines and other content items electronically. Digital magazines in particular can be read using a variety of reading devices, such as dedicated reading devices and general-purpose computing devices such as smartphones and tablets.

Magazine publishers often provide magazine distributors with published digital magazines for distribution to multiple users. However, magazine publishers provide the magazine distributors with magazine content in formats that are inefficient and inconvenient to format and distribute. Typically a magazine publisher provides the magazine distributor with magazine pages constrained to a fixed layout, such as pages in the Portable Document Format (PDF), in the .folio file format, or in an image format. The magazine pages may be contained within large files that are difficult to process and distribute. Moreover, these types of magazine pages are not well-suited for distribution across heterogeneous devices with different screen sizes, user interfaces, and the like. For example, it may be difficult to format a magazine page constrained in a fixed layout for display on a mobile phone or other device with a small screen.

SUMMARY

The above and other problems are addressed by a method and non-transitory computer-readable storage medium for retrieving digital content associated with a digital magazine published by a publisher by using a plurality of feeds. An embodiment of the method comprises retrieving an issue feed from a publisher of a digital magazine. The issue feed includes information about an issue of the digital magazine. The method also comprises analyzing the issue feed to retrieve an identifier identifying a section feed published by the publisher, wherein the section feed includes information about a section of the issue of the digital magazine, and retrieving the section feed from the publisher using the identifier identifying the section feed and analyzing the retrieved section feed to identify information about the section of the digital magazine and a digital content item to be included in the section of the issue of the digital magazine. The method further comprises formatting the issue of the digital magazine to include the information about the issue of the digital magazine, the information about the section of the issue of the digital magazine, and the identified digital content item and presenting the formatted issue of the digital magazine to a user.

An embodiment of the non-transitory computer-readable storage medium comprises executable computer program instructions executable to perform steps comprising retrieving an issue feed from a publisher of a digital magazine. The issue feed includes information about an issue of the digital magazine. The steps also comprise analyzing the issue feed to retrieve an identifier identifying a section feed published by the publisher, wherein the section feed includes information about a section of the issue of the digital magazine, and retrieving the section feed from the publisher using the identifier identifying the section feed and analyzing the retrieved section feed to identify information about the section of the digital magazine and a digital content item to be included in the section of the issue of the digital magazine. The steps further comprise formatting the issue of the digital magazine to include the information about the issue of the digital magazine, the information about the section of the issue of the digital magazine, and the identified digital content item and presenting the formatted issue of the digital magazine to a user.

The above and other problems are addressed by a computing device. An embodiment of the computing device comprises a computer processor for executing computer program instructions and a non-transitory computer-readable storage medium storing computer program instructions. The instructions are executable to perform steps comprising retrieving an issue feed from a publisher of a digital magazine. The issue feed includes information about an issue of the digital magazine. The steps also comprise analyzing the issue feed to retrieve an identifier identifying a section feed published by the publisher, wherein the section feed includes information about a section of the issue of the digital magazine, and retrieving the section feed from the publisher using the identifier identifying the section feed and analyzing the retrieved section feed to identify information about the section of the digital magazine and a digital content item to be included in the section of the issue of the digital magazine. The steps further comprise formatting the issue of the digital magazine to include the information about the issue of the digital magazine, the information about the section of the issue of the digital magazine, and the identified digital content item and presenting the formatted issue of the digital magazine to a user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIG. 5A is an example of a title feed, according to one embodiment.

FIG. 5B is an example of an issue feed, according to one embodiment.

FIG. 5C is an example of a section feed, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality. This description identifies certain illustrated elements using reference numbers followed by letters. For clarity, this description often uses only the reference number to refer to any or all of the entities having that reference number.

In this disclosure, "digital content" generally refers to any machine-readable and machine-storable content, such as digital magazines, other digital content including text (e.g., digital newspapers, digital news stories, digital books, etc.), videos, and music. A "digital content item" refers to a particular piece of digital content, such as an article in a section of a digital magazine issue. The following discussion focuses on the distribution of digital magazines and therefore often describes use cases and examples involving digital magazines and refers to the consumers of the content of the digital magazines as "users." However, the techniques described herein can also be used with other types of digital content.

Figure 1:
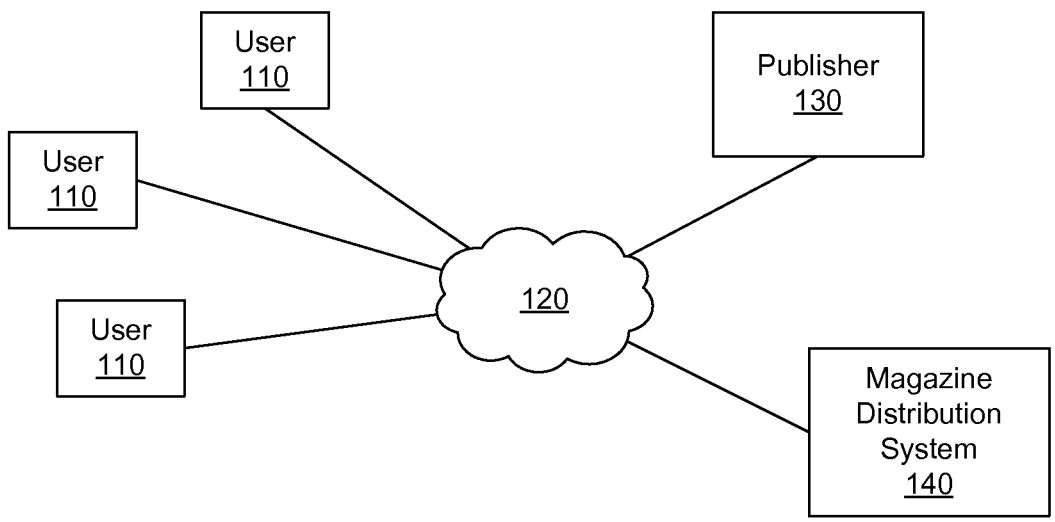
FIG. 1 shows a computing environment for distributing digital magazines to users of a magazine distribution system, according to one embodiment.

FIG. 1 shows a computing environment 100 for distributing digital magazines to users of a magazine distribution system. The computing environment 100 includes multiple users 110, a magazine distribution system 140, and a publisher 130 connected by a communications network 120. Only one magazine distribution system 140, one publisher 130, and three users 110 are shown in FIG. 1 in order to simplify and clarify the description. Embodiments of the computing environment 100 can have multiple magazine distribution systems 140 and publishers 130, and many users 110 connected to the network 140. Likewise, the functions performed by the various entities of FIG. 1 may differ in different embodiments.

The publisher 130 publishes one or more digital magazines. A digital magazine includes a plurality of digital magazine issues that are typically published and made available to users 110. The magazine may be published at regular intervals (e.g., weekly monthly, or yearly) or at irregular intervals. Each digital magazine issue may include one or more sections containing content to be presented to the user. For example, a first section of a digital magazine issue includes digital content items, such as articles or images, related to travel tips, while a second section of the digital magazine issue includes digital content items related to fashion.

In one embodiment, the publisher 130 hosts or stores the digital magazine. For example, the publisher 130 stores information about the digital magazine, information about issues of the digital magazine, and content to be included in various sections of digital magazine issues. Different portions of the digital magazine and information about the digital magazine are stored in different digital content feeds, thereby allowing the publisher 130 to make changes to particular feeds without having to re-publish the entire digital magazine. Hence, the publisher 130 has control of the digital content of the magazine, and can make changes to the content as may be necessary or desired.

The magazine distribution system 140 discovers and accesses the feeds provided by the publisher 130 to obtain content for digital magazines, and distributes the digital magazines to the users. In one embodiment, the magazine distribution system 140 discovers a digital magazine and the content associated with the digital magazine hosted by a publisher 130, retrieves the discovered digital magazine from the publisher 130, and formats the digital magazine for presentation to the one or more users 110 of the magazine distribution system 140. The magazine distribution system 140 may enter into an agreement with the publisher 130 that allows the magazine distribution system 140 to retrieve the digital magazine and the digital content to be included in the digital magazine from the publisher 130. In one embodiment, the information about the digital magazine and the content to be included in the digital magazine is included in a number of feeds that are stored at the publisher 130. The magazine distribution system 140 receives from the publisher 130 a uniform resource identifier (URI), such as a uniform resource locator (URL), to one or more feeds, and uses the URIs to discover the network locations of the feeds and retrieve information and content associated with the digital magazine from the network locations.

The users 110 of the magazine distribution system 140 receive and consume digital content, such as digital magazines, provided by the magazine distribution system 140. For example, a user 110 subscribes to receive issues of a particular digital magazine from the magazine distribution system 140. The users 110 use one or more client devices to receive and view digital content from the magazine distribution system 140. A client device is a computing device capable of receiving user input as well as transmitting and/or receiving data via the network 120. In one embodiment, a client device is a conventional computer system, such as a desktop or laptop computer. Alternatively, a client device may be a device having computer functionality, such as a personal digital assistant (PDA), a mobile telephone, a smartphone or another suitable device. A client device is configured to communicate via the network 120.

In one embodiment, a client device executes an application allowing the user 110 of the client device to view or interact with one or more digital magazines provided by the magazine distribution system 140. For example, a client device executes a browser application to enable interaction between the client device and the distribution system 140 via the network 120. In another embodiment, a client device 110 interacts with the magazine distribution system 140 through an application programming interface (API) running on a native operating system of the client device, such as IOS® or ANDROID™.

The network 120 enables communications among the magazine distribution system 140, the users 110 of the magazine distribution system 140, and the publisher 130. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques. In another embodiment, the network 120 uses custom and/or dedicated data communications technologies.

Figure 2:
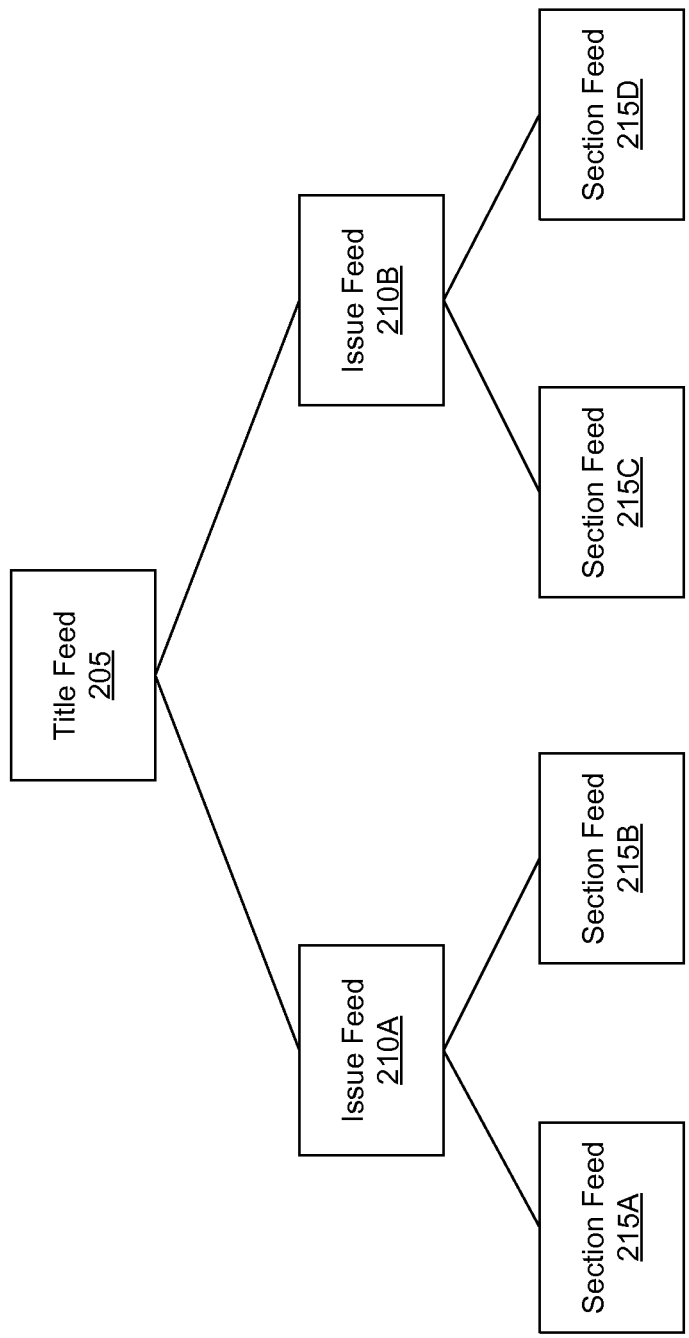
FIG. 2 is a diagram illustrating the different feeds published by a publisher according to one embodiment.

FIG. 2 is a diagram illustrating the different feeds published by a publisher according to one embodiment. The publisher 130 publishes a hierarchy of feeds for a digital magazine. Each feed contains a portion of the digital magazine and/or information that assists the magazine distribution system 140 in identifying another feed containing a different portion of the digital magazine. To distribute the digital magazine to the users 110 the magazine distribution system 140 retrieves the different portions of the digital magazine from the different feeds published by the publisher 130. Thus, the publisher 130 may easily make changes to different portions of the digital magazine by modifying the different feeds for a digital magazine without re-publishing the entire digital magazine.

For each digital magazine the publisher 130 publishes a title feed 205, one or more issue feeds 210, and one or more section feeds 215. The title feed 205 provides the magazine distribution system 140 with general or high level information about the digital magazine. The title feed 205 particularly includes high level information about each issue of the digital magazine published by the publisher, such as the name of the issue and the date the issue was published. The title feed 205 does not include digital content items to be included in an issue of the digital magazine, but instead provides the magazine distribution system 140 with an overview of each issue of the digital magazine published by the publisher 130. Further, along with the information providing an overview of each issue of the digital magazine, the title feed 205 identifies an issue feed 210 associated with each issue of the digital magazine published by the publisher 130.

An issue feed 210 includes high level information providing an overview of each section in a specific issue of the digital magazine, such as the name of each section in the digital magazine issue and an image to be included in the section of the digital magazine issue. Like the title feed 205, the issue feed does not include digital content items, such as articles, to be included in the issue of the digital magazine, but instead provides the magazine distribution system 140 with information describing sections within the digital magazine issue. The issue feed 210 also includes information identifying a section feed 215 associated with each section of the digital magazine issue. A section feed 215 includes the digital content items to be included in a section of the digital magazine issue.

Thus, the hierarchy of feeds allows the publisher 130 to provide the magazine distribution system 140 with both an overview of each digital magazine issue of a digital magazine, and the digital content items to include in each digital magazine issue of the digital magazine. This allows the magazine distribution system 140 to discover the portions of each digital magazine issue published by the publisher 130 and the format of each digital magazine issue (e.g., the number of sections in each digital magazine issue), prior to retrieving the digital content items to include in each digital magazine issue.

Figure 3:
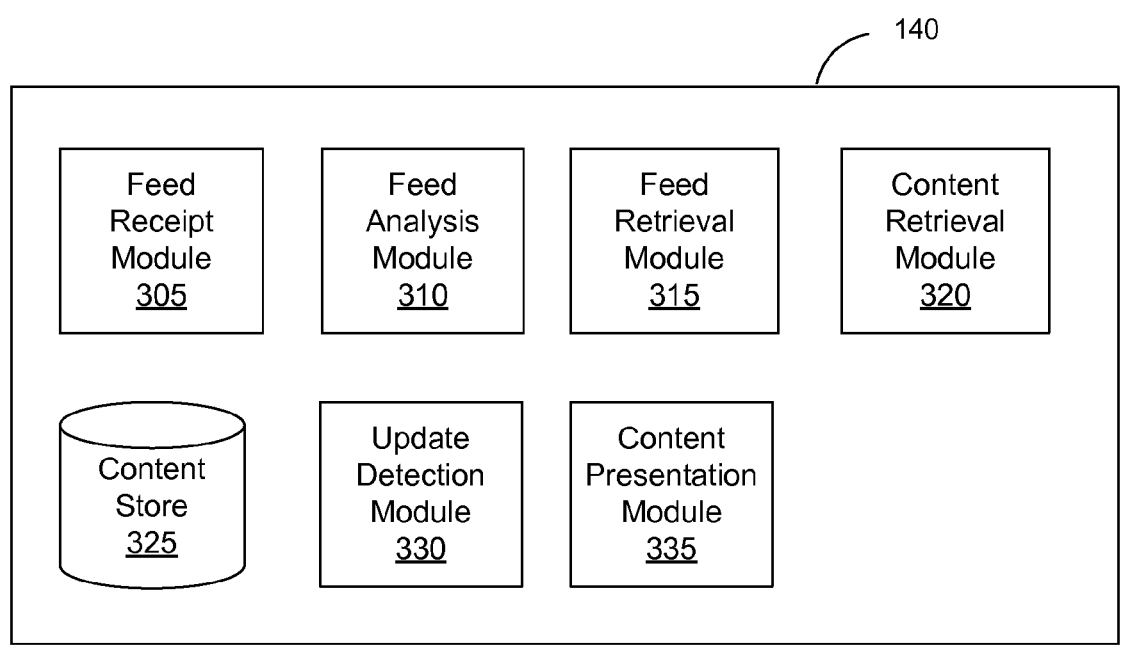
FIG. 3 is a high-level block diagram illustrating details of the magazine distribution system, according to one embodiment.
Figure 4:
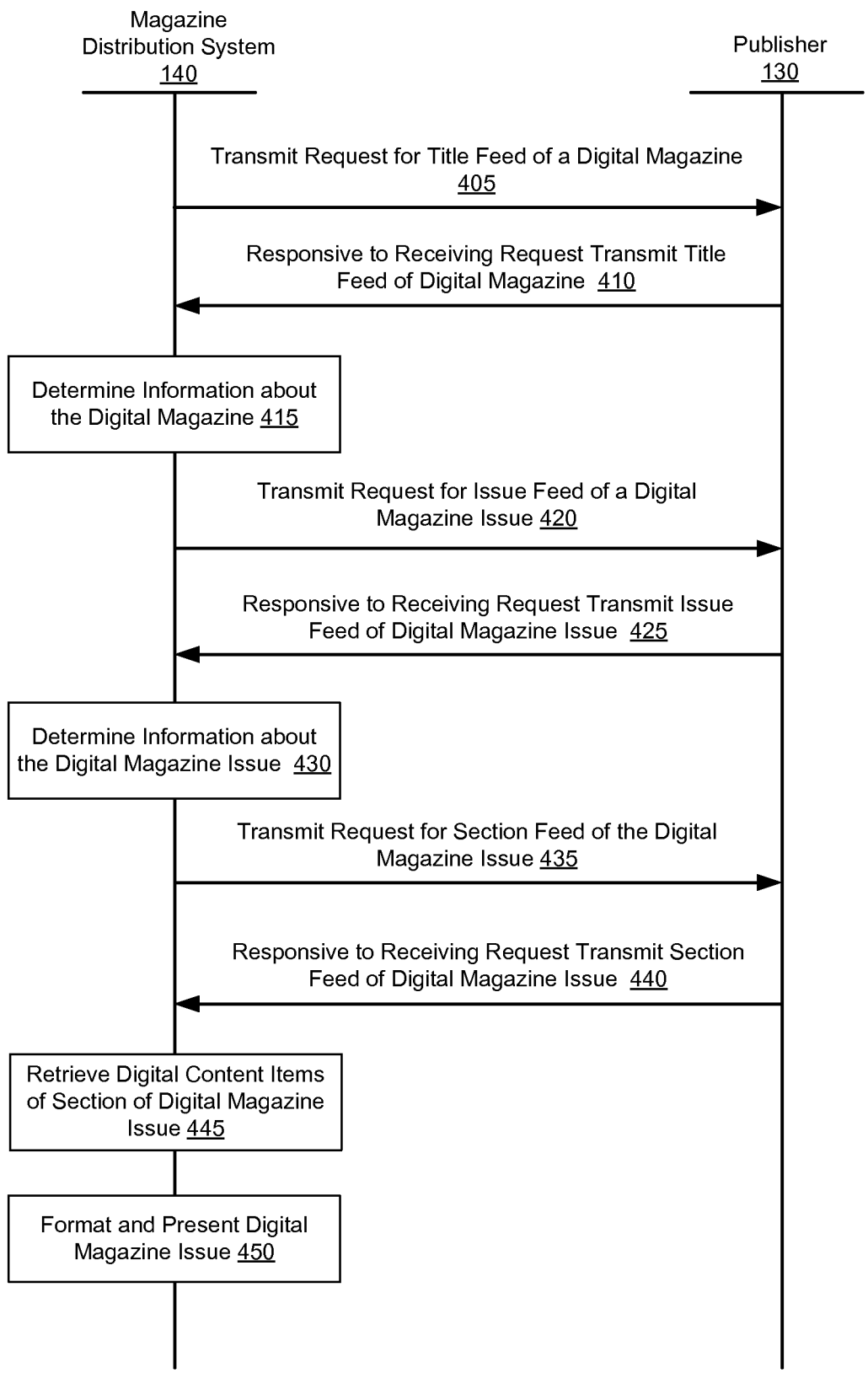
FIG. 4 is an interaction diagram illustrating the magazine distribution system retrieving various feeds of a digital magazine from a publisher in order to format and present the digital magazine to a user, according to one embodiment.

Each feed published by the publisher 130 may also include an update indicator that notifies the magazine distribution system 140 if a feed has been updated. Thus, the publisher may update the title feed 205 to include information about a new issue of the digital magazine recently published by the publisher 130. The magazine distribution system 140 upon identifying that the title feed has been updated is made aware of the new issue of the digital magazine published by the publisher 130 and may then proceed to retrieve the issue feed 210 associated with the recently published issue of the digital magazine. The magazine distribution 140 subsequently retrieves the section feeds 215 associated with the retrieved issue feed 210 to obtain the digital content items to include in each section of the recently published digital magazine issue. FIG. 3 and FIG. 4 describe in greater detail the process by which the magazine distribution system 140 discovers and retrieves feeds published by a publisher 130, so as to retrieve the content of digital magazine issues of a digital magazine to format and distribute to user 110 of the magazine distribution system 140.

In the example of FIG. 2 the publisher 130 publishes a title feed 205 generally describing a digital magazine, and including information about two issues of the digital magazine. The title feed 205 also includes information identifying issue feeds 210A and 210B each associated with an issue of the two issues of the digital magazine. Each issue feed 210 includes information identifying section feeds 215. In the example of FIG. 2A, the issue feed 210A includes information identifying section feed 215A and section feed 215B each associated with a section in the issue of the digital magazine associated with the issue feed 210A. The issue feed 210B includes information identifying section feed 210C and section feed 210D each associated with a section in the issue of the digital magazine associated with issue feed 210B. Thus, the publisher publishes a hierarchy of feeds to assist the magazine distribution system 140 with the discovery and retrieval of digital magazine issue to distribute to users 110.

FIG. 3 is a high-level block diagram illustrating details of the magazine distribution system 140 according to one embodiment. In the embodiment shown, the magazine distribution system 140 contains a variety of different modules for retrieving and analyzing the feeds published by the publisher 130, and for storing and presenting content to users 110. Those of skill in the art will recognize that other embodiments of the magazine distribution system 140 can have different and/or additional modules other than the ones described here, and that the functions may be distributed among the modules in a different manner.

A feed receipt module 305 receives one or more title feeds from a publisher 130. A title feed, as published by a publisher 130, is a feed, such as an atom feed or an RSS (Rich Site Summary) feed, including information about a digital magazine and one or more issues of the digital magazine. The feed receipt module 305 receives a uniform resource identifier (URI), such as a uniform resource locator (URL), associated with the title feed from a publisher 130, and uses the URI to retrieve the title feed from the publisher 130, a publisher's server, or another server storing the title feed. For example, the feed receipt module 305 sends a request for the title feed to the publisher 130 including the URI identifying the title feed of the digital magazine. The publisher 130 upon receiving the request provides the feed receipt module 305 with the title feed for the digital magazine. The feed receipt module 305 may receive the title feed from the publisher via different communication channels as well. The feed receipt module 305 may also store the title feed in the content store 325.

The feed analysis module 310 analyzes the title feed of the magazine to determine general information about the digital magazine, information providing an overview of one or more issues of the digital magazine, and information identifying the issue feeds associated with the one or more issues of the digital magazine. In one embodiment, the feed analysis module 310 parses the title feed to determine the title of the digital magazine and information about the one or more issues of the digital magazine, particularly information identifying the issue feeds associated with the one or more issues of the digital magazine. Examples of information about an issue of a digital magazine determined by the feed analysis module 310 include the title of the digital magazine issue, the identifier identifying the digital magazine issue, the link or URL identifying the location for an issue feed of the digital magazine issue published by the publisher 130, and the link or URL to the cover image of the digital magazine issue. The feed analysis module 310 may store the information about the digital magazine and the information about the digital magazine issues in the content store 325, and may associate an identifier with the stored information such that the stored information may be retrieved at a later time by the magazine distribution system 140 or one or more modules of the magazine distribution system 140.

The feed retrieval module 315 discovers the location of and retrieves one or more issue feeds of the digital magazine. The feed retrieval module 315 may receive from the feed analysis module 310 or from the content store 325 a URL identifying the location of an issue feed for an issue of the digital magazine. The feed retrieval module 315 retrieves the issue feed from the publisher 130 using the URL of the issue feed. For example, the feed retrieval module 315 sends a request for the issue feed to the publisher 130 including the URL identifying the issue feed for an issue of the digital magazine. The publisher 130 upon receiving the request provides the feed retrieval module 315 with the issue feed for the digital magazine issue. The feed retrieval module 315 may also store the issue feed in the content store 325.

A content retrieval module 320 analyzes an issue feed of the magazine to determine general information about the digital magazine issue, such as the location of the cover image of the digital magazine issue, to determine information about one or more sections of the digital magazine issue, and to determine the location of one or more section feeds associated with the one or more sections of the digital magazine issue. In one embodiment, the content retrieval module 320 parses the issue feed to determine the title of the digital magazine issue, and particular information about one or more sections of the digital magazine issue. Examples of information about a section of the digital magazine issue determined by the content retrieval module 320 include the title of the section of digital magazine issue, the identifier identifying the section of the digital magazine issue, and the link or URL identifying the location for a section feed of the section of the digital magazine issue published by the publisher 130. The content retrieval module 320 may store the information about the digital magazine issue and the information about the sections in the digital magazine issue in the content store 325, and associate an identifier with the stored information such that the stored information may be retrieved at a later time by the magazine distribution system 140 or one or more modules of the magazine distribution system 140.

The content retrieval module 320 retrieves one or more section feeds of the sections of the digital magazine issues. Each section feed retrieved includes information about a particular section of the digital magazine issue as well as content to be included in the section of the digital magazine issue. The content retrieval module 320 may retrieve the section feed from the publisher 130 using the URL for the section feed. For example, the content retrieval module 320 sends a request for the section feed to the publisher 130 including the URL identifying the section feed for a section of the digital magazine issue. The publisher 130 upon receiving the request provides the content retrieval module 320 with the section feed for the section of the digital magazine issue. The content retrieval module 320 may also store the section feed in the content store 325.

The content retrieval module 320 analyzes the section feed of the section of the digital magazine issue to determine information about the section, such as the title of the section, and to determine information about one or more digital content items of the section. In one embodiment, the content retrieval module 320 parses the section feed to determine the title of the section of the digital magazine issue, and particular information about one or more digital content items of the section. Examples of information about a digital content item of the section determined by the content retrieval module 320 include the title of the digital content item, the identifier identifying the digital content item, the author of the digital content item, one or more images to present along with the digital content item, and the content, such as text or images, of the digital content item to be presented to the user. The content retrieval module 320 may store the information about the section of the digital magazine issue and the information about the digital content items of the section in the content store 325, and associate an identifier with the stored information such that the stored information may be retrieved at a later time by the magazine distribution system 140 or one or more modules of the magazine distribution system 140.

The content store 325 stores information associated with publishers 130, users 110 of the magazine distribution system 140, and digital magazines published by the publishers 130 to be presented to the users 110 by the magazine distribution system 140. The content store 325 may store information about a publisher 130, such as the name of the publisher 130, contact information about the publisher 130, and agreements or permissions associated with the publisher 130. The content store 130 may also store information about one or more users 110 of the magazine distribution system 140. The content store 130 may store declarative information about a user 110 that was explicitly shared by the user and may also include information inferred by the magazine distribution system 140. Further, the content store 140 may store subscription information identifying the digital magazines to which a user 110 is subscribed. The magazine distribution system 140 may use the subscription information to identify digital magazines to present to the user 110 or make available to be consumed by the user 110.

The content store 325 also stores information and content associated with digital magazines published by the publisher 130. In one example, the content store 325 includes the title feed, the issue feed, and the section feed for a digital magazine retrieved from a publisher 130. Additionally, the content store 325 may separately store the information retrieved from the various feeds. For example, the content store 325, for a single digital magazine, may store information about the digital magazine, one or more issues of the digital magazine, one or more sections of each issue of the digital magazine, and the digital content items to be included in each section of an issue of the digital magazine. Further, the content store 325 may also store information about a digital magazine inferred by the magazine distribution system 140, such as the frequency at which the digital magazine is published 140, the average number of subscribers to an issue of the digital magazine, or the frequency at which portions of a digital magazine are updated.

An update detection module 330 determines if an update has been made by a publisher to the title feeds, the issue feeds, or the section feeds published by the publisher 130. In one embodiment, the update detection module 330 sends a request to the publisher 130 for a title feed, using the URL identifying the title feed for example. The request for the title feed may be sent at a predetermined frequency. Upon receiving the title feed from the publisher 130 the update detection module 330 determines if additional information has been added to the title feed by the publisher 130, or if previously present information in the title feed has been changed or modified by the publisher 130. In one example, the update detection module 330 determines if a change to the title feed has been made based on the information included in an updated field of the title feed. For instance, if the updated field includes an identifier notifying the update detection module 330 that the title feed has been modified, updated, or additional information has been added to the title feed, the update detection module 330 is then aware that there has been a change to the title feed. In another example, the update detection module 330 compares the retrieved title feed to the title feed stored in the content store 325 and determines if any changes have been made to the title feed based on the comparison. Similar methods may be applied by the update detection module 330 to determine if an issue feed or a section feed hosted by the publisher 130 has been updated.

The update detection module 330 may store the retrieved title feed 330 in the content store 325. Further, the update detection module 330 may modify content in the content store 325 upon detecting an update to one or more feeds. For example, on detecting an update to an issue feed the update detection module 330 may identify the updated portion of the issue feed and may update the corresponding information associated with the issue feed stored in the content store 325. In one embodiment, on identifying that a feed has been updated, the update detection module 330 may forward instructions to the feed analysis module 310, the feed retrieval module 315, or the content retrieval module 320 to retrieve the feed, analyze the feed, and retrieve and store the information or content included in the feed as was described in conjunction with the description of each of the modules above.

A content presentation module 335 formats the digital magazine and provides the digital magazine to be consumed by user 110 via a client device. The content presentation module 340 may retrieve a digital magazine issue and format the digital magazine issue for presentation to a user 110 of the digital magazine distribution system 140. In one embodiment, the content presentation module 335 identifies, based on information about a user 110 stored in the content store 325 a digital magazine to which a user is subscribed. The content presentation module 335 retrieves an issue of the digital magazine including the information about the issue of the digital magazine, such as the title of the digital magazine and the image to include on the cover of the digital magazine issue, information about one or more sections of the digital magazine issue, and the digital content items to include in each of the one or more sections from the content store 325 or from the feeds stored in the content store 325.

The content presentation module 335 formats the retrieved issue of the digital magazine based on various criteria, such as the client device used by the user 110 or the application executing on the client device used by the user 110. In another example, the content presentation module 335 formats the digital content items to include in the sections of the digital magazine issue based on the stylistic preferences and indicators included in the section feed published by the publisher 130. For example, a section feed may include information specifying that a certain portion of the text of a digital content item should be underlined. The content presentation module 335 underlines the portion of the text of the digital content item while formatting the digital content item for presentation to a user. The content presentation module 335 provides the user 110 with the formatted digital magazine issue (including the various digital content items included in the sections of the digital magazine issue) for consumption. For example, the content generation module 335 may provide the client device or an application executing on the client device of the user 110 with the formatted digital magazine issue for presentation to the user 110.

FIG. 4 is an interaction diagram illustrating one embodiment of the magazine distribution system retrieving various feeds of a digital magazine from a publisher in order to format and present the digital magazine to a user. The magazine distribution system 140 transmits 405 a request for the title feed for a digital magazine to a publisher 130. In one example, the request may include the URI of the title feed provided by the publisher 130 as described above with respect to FIG. 3. Responsive to receiving the URI for the title feed from the magazine distribution system 140, the publisher 130 transmits 410 the title feed for the digital magazine to the magazine distribution system 140. The magazine distribution system 140 analyzes the received title feed for the digital magazine to determine 415 information about the digital magazine, such as the title of the digital magazine, and information about one or more issues of the digital magazine. In particular, the magazine distribution system 140 determines from the title feed a URI for an issue feed including information about an issue of the digital magazine.

The magazine distribution system 140 transmits 420 a request for the issue feed of a digital magazine issue to the publisher 130. The request includes the URI of the issue feed determined by the magazine distribution system 140. Responsive to receiving the URI for the issue feed from the magazine distribution system 140, the publisher 130 transmits 425 the issue feed for the digital magazine issue to the magazine distribution system 140. Upon receiving the issue feed for an issue of the digital magazine from the publisher 130, the magazine distribution system 140 determines 430 from the issue feed information about the digital magazine issue as well as information about one or more sections of the digital magazine issue. Each section of the digital magazine issue includes digital content items to be presented to the user of the digital magazine server 140 as part of the digital magazine issue. The magazine distribution system 140 determines 430 from the issue feed the URI for a section feed of the digital magazine issue. The section feed as described in conjunction with FIG. 3 above includes information about a section of the digital magazine issue.

The magazine distribution system 140 transmits 435 a request for the section feed for a section of the digital magazine issue to the publisher 130. The request includes the URI of the section feed determined by the magazine distribution system 140. Responsive to receiving the URI for the section feed from the magazine distribution system 140, the publisher 130 transmits 440 the section feed for the section of the digital magazine issue to the magazine distribution system 140. Upon receiving the section feed for the section of the digital magazine issue from the publisher 130, the magazine distribution system 140 retrieves 445 from the section feed information about the section of the digital magazine as well as one or more digital content items to be included in the section of the digital magazine issue as described in conjunction with FIG. 2 above. The magazine distribution system 140 may store the content and information included in the various feeds retrieved from the publisher 130 in the content store 325.

The magazine distribution system 140 formats 450 the digital magazine and provides the digital magazine to be consumed by user 110 via a client device. The magazine distribution system 140 formats 450 the issue of the digital magazine to include the information about the issue of the digital magazine, such as the title of the digital magazine and the image to include on the cover of the digital magazine issue, information about one or more sections of the digital magazine issue, and the digital content items to include in each of the one or more sections of the digital magazine. Further, the magazine distribution system 140 provides the formatted digital magazine issue to the user 110, via the client device of the user 110, for consumption.

FIG. 5A is an example of one embodiment of a title feed. The title feed published by the publisher 130 has a number of fields including information about the digital magazine, such as the title, as well as information about one or more digital magazine issues and the discovery of the digital magazine issues. In the example of FIG. 5A the title feed 505 includes a title field 502, an id field 504, an update field 506, and a plurality of entries. The title field 502 includes the title of the magazine, such as "Acme Magazine." The id field 504 includes an identifier identifying the digital magazine, such as a URI. The updated field 506 includes an identifier notifying the magazine distribution system 140 of whether the title feed has been updated by the publisher 130 to include additional fields or information.

The title feed 505 also includes one or more entries. Each entry includes information about an issue of the digital magazine. In the example of FIG. 5A, the entry includes an entry id field 510, an entry updated field 512, an entry published feed 514, entry title field 516, an entry alternate-link field 518, and an entry cover-link field. The entry id field 510 includes an identifier identifying the issue of the digital magazine, such as a URI. The entry updated field 512 includes an identifier notifying the magazine distribution system 140 if any of the entry fields in the title feed 505 have been changed, modified, or updated. The entry published field 514 includes information about the date and time the issue of the digital magazine was published. The entry title field 516 includes information about the specific title of the digital magazine issue. For example, the entry title field for the "Acme Magazine" may include the digital magazine issue title "Acme vol. 245" or "Acme, Jun. 7 2014."

The entry alternate-link field 518 includes a link or URI, such as a URL, to an issue feed for the digital magazine issue. The issue feed published and hosted by the publisher 130 includes information about the digital magazine issue as well as information about one or more sections in the digital magazine issue. The alternate-link included in the alternate-link field 518 may be used by the magazine distribution system 140 to discover and retrieve the issue feed identified by the alternate-link. The entry cover-link field includes a link to one or more images associated with the digital magazine issue, such as the cover image for the digital magazine issue. Thus, the title feed provides information to the magazine distribution system 140 about the digital magazine issue for the digital magazine that the publisher 130 has published. When a publisher 130 publishes a new digital magazine issue the publisher adds a new entry to the title feed and updates the updated field 516 to notify the magazine distribution system 140 that the title feed 505 has been updated with a new entry including information about a new issue of the digital magazine. Further, through the title feed 505 the publisher 130 provides the magazine distribution system 140 with information to discover an issue feed including information about a specific digital magazine issue.

The issue feed published by the publisher 130 has a number of fields including information about the digital magazine issue, such as the title of the digital magazine issue, as well as information about one or more sections of the digital magazine issue and the discovery of the one or more sections of the digital magazine issue. FIG. 5B is an example of one embodiment of an issue feed. In the example of FIG. 5B the issue feed 515 includes a title feed 522, an id field 524, an update field 526, a logo field 528 and a plurality of entries. The title field 522 includes the title of the digital magazine issue, such as "Acme Jan. 7 2014." The id field 524 includes an identifier identifying the digital magazine issue, such as a URI. The updated field 526 includes an identifier notifying the magazine distribution system 140 of whether the issue feed 515 has been updated by the publisher 130 to include additional fields or information. The logo field 528 may include the cover image of the digital magazine issue or a link to the cover image of the digital magazine issue.

The issue feed 515 also includes one or more entries. Each entry includes information about a section of the digital magazine issue. In the example of FIG. 5B, an entry includes an entry id field 530, an entry title field 532, an entry updated field 534, and an entry alternate-link field 536. The entry id field 530 includes an identifier identifying the section of the digital magazine issue, such as a URI. The entry title field 532 includes the title of the section of the digital magazine issue, such as "Hunting Season." The entry updated field 534 includes an identifier notifying the magazine distribution system 140 if any of the entry fields in the issue feed 515 have been changed, modified, or updated. The entry alternate-link field 536 includes a link or URI, such as a URL, to a section feed for the section of the digital magazine issue. The section feed published and hosted by the publisher 130 includes information about the section of the digital magazine issue as well as content to be included in the section of the digital magazine issue. The alternate-link included in the alternate-link field 536 may be used by the magazine distribution system 140 to discover and retrieve the section feed identified by the alternate-link. Thus, the issue feed provides information to the magazine distribution system 140 about the sections of the digital magazine issue that the publisher 130 has published. When a publisher 130 publishes a new section of the digital magazine issue the publisher adds a new entry to the issue feed 515 and updates the updated field 526 to notify the magazine distribution system 140 that the issue feed 515 has been updated with a new entry including information about a new section of the digital magazine issue. Further, through the issue feed 515 the publisher 130 provides the magazine distribution system 140 with information to discover a section feed including information about a specific section of the digital magazine issue and digital content items to be included in a section of the digital magazine issue.

The section feed published by the publisher 130 has a number of fields including information about the section of the digital magazine issue, such as the title of the section of the digital magazine issue, as well as information about one or digital content items to be included in the section of the digital magazine issue. FIG. 5C is an example of one embodiment of a section feed. In the example of FIG. 5C the section feed 525 includes a title field 540, an id field 542, an updated field 544, and a plurality of entries. The title field 540 includes the title of the section of the digital magazine issue. The id field 542 includes an identifier identifying the section of the digital magazine issue, such as a URI. The updated field 544 includes an identifier notifying the magazine distribution system 140 of whether the section feed 525 has been updated by the publisher 130 to include additional fields or information, such as when the publisher adds a new entry to the section feed 525.

The section feed 525 also includes one or more entries. Each entry includes information about a digital content item, such as an article, image, narrative or creative piece, to be included in the section of the digital magazine issue. In the example of FIG. 5C, an entry includes an entry id field 546, an entry title field 548, an entry updated field 550, entry author field 552, an entry enclosure-link field, and an entry content field 556. The entry id field 546 includes an identifier identifying the digital content item of the section of the digital magazine issue, such as a URI. The entry title field 548 includes the title of the section of the digital content item. The entry updated field 550 includes an identifier notifying the magazine distribution system 140 if any of the entry fields in the entry of the section feed 525 have been changed, modified, or updated, such as when the title or content of the digital content item have been changed. The entry author field 552 includes the author of the digital content item related to the entry. The entry enclosure link field includes an image or a link to an image that is to be displayed along with the digital content item to the user 110 of the magazine distribution system 140. The entry content field 556 includes the content of the digital content item, such as the text and images of an article, to be presented to the user 110.

In one embodiment, the entry content field 556 further includes a plurality of fields including the different portions of the content of the digital content item. Example of fields included in the entry content field 556 include a subtitle field including a secondary title for the digital content item, a paragraph field 560 including text to be included in a paragraph of the digital content item and marking the separation between different paragraphs of the digital content item, an image credit tag to indicate the credit for an image in the digital content item, and an image field 562 including an image or a link to an image to be included in the content of the digital content item. Further, the entry content field 556 may include a number of indicators related to the stylistic preferences expressed by the publisher 130. Examples of indicators included in the entry content field 556 included a bold indicator indicating that a portion of text of the digital content item should appear in bold font, an italics indicator indicating that a portion of text of the digital content item should be italicized, and an underline indicator indicating that a portion of text of the digital content item should be underlined.

Thus, the section feed 525 provides information to the magazine distribution system 140 about the sections of the digital magazine issue that the publisher 130 has published and the digital content items to be included in the section of the digital magazine issue. When a publisher 130 publishes a new digital content item of the section the publisher adds a new entry to the section feed 525 and updates the updated field 544 to notify the magazine distribution system 140 that the section feed 525 has been updated with a new entry including information about a new digital content item to be included in the section of the digital magazine issue. Further, through the section feed 525 the publisher 130 provides the magazine distribution system 140 with information about a section of the digital magazine issue as well as the digital content items (including information about the digital content items and the content of the digital content items) to be included in the section of the digital magazine issue.

Figure 6:
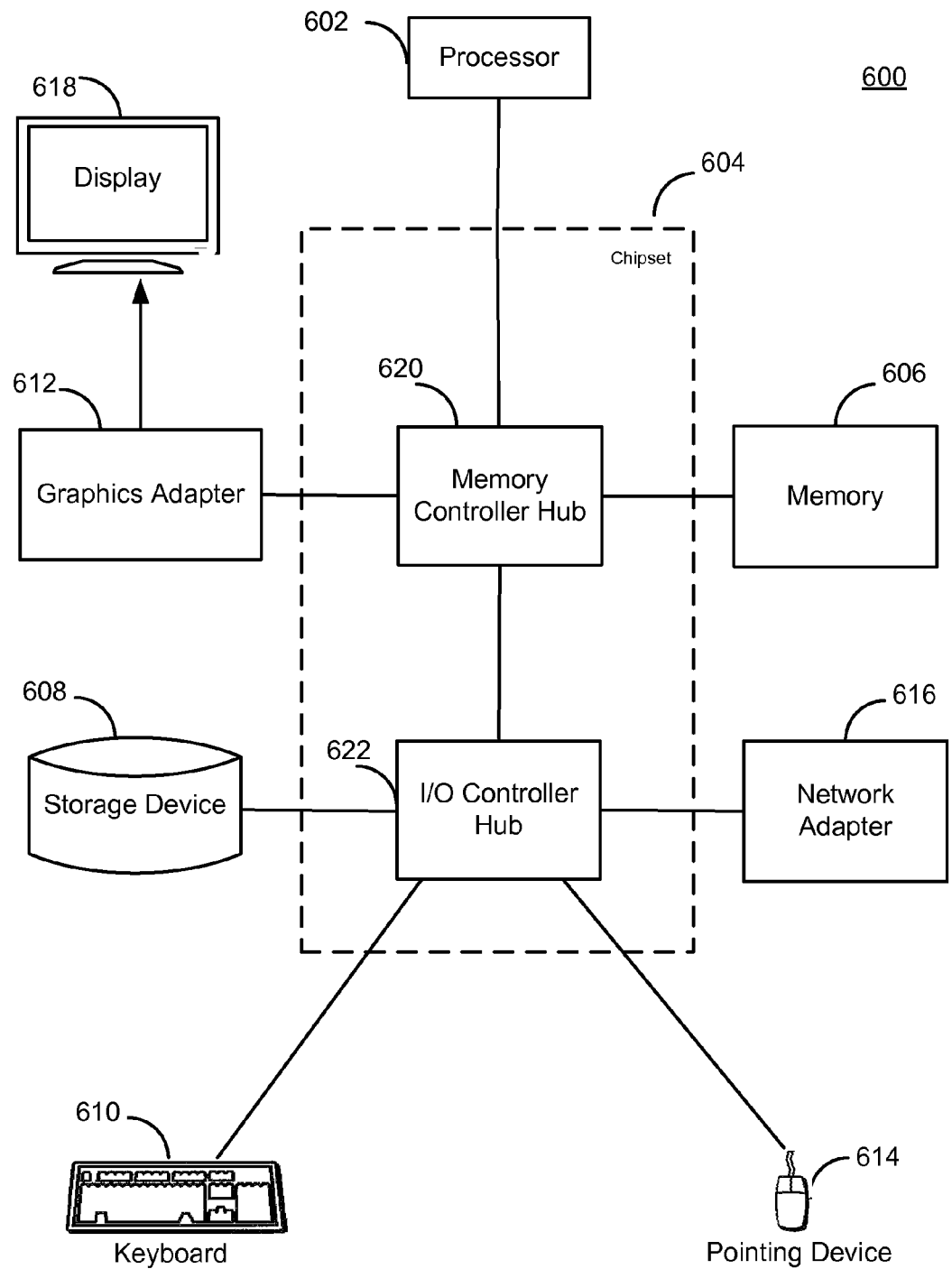
FIG. 6 is a high-level block diagram of a computer for acting as the magazine distribution system, the publisher, and/or a client device used by a user, according to one embodiment.

The entities shown in FIG. 1 are implemented using one or more computers. FIG. 6 is a high-level block diagram of a computer 600 for acting as the magazine distribution system 140, the publisher 130, and/or a client device used by a user 110, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, touch sensitive display, or other type of pointing device, and is used in combination with the keyboard 610 to input data into the computer system 600. The graphics adapter 612 displays images and other information on the display 618. The network adapter 616 couples the computer system 600 to the network 120.

As is known in the art, a computer 600 can have different and/or other components than those shown in FIG. 6. In addition, the computer 600 can lack certain illustrated components. For example, the computers acting as the magazine distribution system 140 can be formed of multiple blade servers linked together into one or more distributed systems and lack components such as keyboards and displays. Moreover, the storage device 608 can be local and/or remote from the computer 600 (such as embodied within a storage area network (SAN)).

The computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method comprising:
accessing a plurality of different digital feeds provided by a publisher of a digital magazine, the plurality of different feeds arranged in a hierarchy having a plurality of levels, accessing the plurality of different digital feeds comprising:
retrieving a title feed from the publisher of the digital magazine, the title feed at atop level of the hierarchy and including information about a plurality of issues of the digital magazine and not including digital content items for the plurality of issues of the digital magazine;

analyzing the title feed to retrieve an identifier identifying an issue feed below the title feed in the hierarchy, wherein the identifier identifying the issue feed is a uniform resource identifier or a uniform resource locator identifying a network location of the issue feed;

retrieving the issue feed from the publisher of the digital magazine using the identifier identifying the issue feed, the issue feed including information about an issue of the digital magazine and not including digital content items for the issue of the digital magazine;

analyzing the issue feed to retrieve an identifier identifying a section feed below the issue feed in the hierarchy, wherein the identifier identifying the section feed is a uniform resource identifier or a uniform resource locator identifying a network location of the section feed;

retrieving the section feed from the publisher using the identifier identifying the section feed; and analyzing the retrieved section feed to identify information about the section of the issue of the digital magazine and a digital content item to be included in the section of the issue of the digital magazine;

formatting the issue of the digital magazine to include the information about the issue of the digital magazine, the information about the section of the issue of the digital magazine, and the identified digital content item;

and presenting the formatted issue of the digital magazine to a user.

2. The computer-implemented method of claim 1, wherein retrieving the issue feed from the publisher of the digital magazine comprises: transmitting a request to the publisher for the issue feed, the request using the identifier identifying the issue feed; and receiving the issue feed from the publisher in response to the request.

3. The computer-implemented method of claim 1, further comprising: analyzing the title feed to retrieve information about the digital magazine; and formatting the issue of the digital magazine to further include the information about the digital magazine.

4. The computer-implemented method of claim 1, wherein retrieving the section feed from the publisher using the identifier identifying the section feed comprises: transmitting a request to the publisher for the section feed, the request using the identifier identifying the section feed; and receiving the section feed from the publisher in response to the request.

5. The computer-implemented method of claim 1, wherein analyzing the issue feed to retrieve the identifier identifying the section feed comprises:

identifying a plurality of entries in the issue feed including information about the section of the issue of the digital magazine;

identifying an entry of the plurality of entries including the identifier identifying the section feed; and retrieving the identifier identifying the section feed.

6. The computer-implemented method of claim 1, wherein analyzing the retrieved section feed to identify information about the section of the issue of the digital magazine and a digital content item to be included in the section of the issue of the digital magazine comprises:

identifying a plurality of entries in the section feed including different portions of the digital content item; and retrieving the digital content item to include in the section of the issue of the digital magazine by retrieving the different portions of the digital content item from the identified plurality of entries in the section feed.

7. The computer-implemented method of claim 6, wherein a portion of the digital content item comprises at least one of a title of the digital content item, an image of the digital content item, and a text portion of the digital content item.

8. A non-transitory computer-readable storage medium storing executable computer program instructions, the instructions executable to perform steps comprising:

accessing a plurality of different digital feeds provided by a publisher of a digital magazine, the plurality of different feeds arranged in a hierarchy having a plurality of levels, accessing the plurality of different digital feeds comprising:

retrieving a title feed from the publisher of the digital magazine, the title feed at a top level of the hierarchy and including information about a plurality of issues of the digital magazine and not including digital content items for the plurality of issues of the digital magazine;

analyzing the title feed to retrieve an identifier identifying an issue feed below the title feed in the hierarchy, wherein the identifier identifying the issue feed is a uniform resource identifier or a uniform resource locator identifying a network location of the issue feed;

retrieving the issue feed from the publisher of the digital magazine using the identifier identifying the issue feed, the issue feed including information about an issue of the digital magazine and not including digital content items for the issue of the digital magazine;

analyzing the issue feed to retrieve an identifier identifying a section feed below the issue feed in the hierarchy, wherein the identifier identifying the section feed is a uniform resource identifier or a uniform resource locator identifying a network location of the section feed;

retrieving the section feed from the publisher using the identifier identifying the section feed; and analyzing the retrieved section feed to identify information about the section of the issue of the digital magazine and a digital content item to be included in the section of the issue of the digital magazine;

formatting the issue of the digital magazine to include the information about the issue of the digital magazine, the information about the section of the issue of the digital magazine, and the identified digital content item; and presenting the formatted issue of the digital magazine to a user.

9. The non-transitory computer-readable storage medium of claim 8, wherein retrieving the issue feed from the publisher of the digital magazine comprises: transmitting a request to the publisher for the issue feed, the request using the identifier identifying the issue feed; and receiving the issue feed from the publisher in response to the request.

10. The non-transitory computer-readable storage medium of claim 8, further comprising: analyzing the title feed to retrieve information about the digital magazine; and formatting the issue of the digital magazine to further include the information about the digital magazine.

11. The non-transitory computer-readable storage medium of claim 8, wherein retrieving the section feed from the publisher using the identifier identifying the section feed comprises: transmitting a request to the publisher for the section feed, the request using the identifier identifying the section feed; and receiving the section feed from the publisher in response to the request.

12. The non-transitory computer-readable storage medium of claim 8, wherein analyzing the issue feed to retrieve the identifier identifying the section feed comprises:
- identifying a plurality of entries in the issue feed including information about the section of the issue of the digital magazine;
- identifying an entry of the plurality of entries including the identifier identifying the section feed; and
- retrieving the identifier identifying the section feed.

13. The non-transitory computer-readable storage medium of claim 8, wherein analyzing the retrieved section feed to identify information about the section of the issue of the digital magazine and a digital content item to be included in the section of the issue of the digital magazine comprises:
- identifying a plurality of entries in the section feed including different portions of the digital content item; and
- retrieving the digital content item to include in the section of the issue of the digital magazine by retrieving the different portions of the digital content item from the identified plurality of entries in the section feed.

14. A computer comprising:
- a computer processor for executing computer program instructions;
- a non-transitory computer-readable storage medium storing computer program instructions executable to perform steps comprising:
- accessing a plurality of different digital feeds provided by a publisher of a digital magazine, the plurality of different feeds arranged in a hierarchy having a plurality of levels, accessing the plurality of different digital feeds comprising:
  - retrieving a title feed from the publisher of the digital magazine, the title feed at a top level of the hierarchy and including information about a plurality of issues of the digital magazine and not including digital content items for the plurality of issues of the digital magazine;
  - analyzing the title feed to retrieve an identifier identifying an issue feed below the title feed in the hierarchy, wherein the identifier identifying the issue feed is a uniform resource identifier or a uniform resource locator identifying a network location of the issue feed;
  - retrieving the issue feed from the publisher of the digital magazine using the identifier identifying the issue feed, the issue feed including information about an issue of the digital magazine and not including digital content items for the issue of the digital magazine;
  - analyzing the issue feed to retrieve an identifier identifying a section feed below the issue feed in the hierarchy, wherein the identifier identifying the section feed is a uniform resource identifier or a uniform resource locator identifying a network location of the section feed;
  - retrieving the section feed from the publisher using the identifier identifying the section feed; and
  - analyzing the retrieved section feed to identify information about the section of the issue of the digital magazine and a digital content item to be included in the section of the issue of the digital magazine;
- formatting the issue of the digital magazine to include the information about the issue of the digital magazine, the information about the section of the issue of the digital magazine, and the identified digital content item; and
- presenting the formatted issue of the digital magazine to a user.

* * * * *